(12) United States Patent
Bugajski

(10) Patent No.: US 10,717,675 B2
(45) Date of Patent: Jul. 21, 2020

(54) REFRACTORY MAGNESIA CEMENT

(71) Applicant: Jerzy Bugajski, Villach (AT)

(72) Inventor: Jerzy Bugajski, Villach (AT)

(73) Assignee: KERNEOS, Puteaux (FR)

( * ) Notice: Subject to any disclaimer, the term of this patent is extended or adjusted under 35 U.S.C. 154(b) by 22 days.

(21) Appl. No.: 15/780,969

(22) PCT Filed: Nov. 29, 2016

(86) PCT No.: PCT/EP2016/079082
§ 371 (c)(1),
(2) Date: Jun. 1, 2018

(87) PCT Pub. No.: WO2017/093222
PCT Pub. Date: Jun. 8, 2017

(65) Prior Publication Data
US 2018/0265409 A1    Sep. 20, 2018

(30) Foreign Application Priority Data

Dec. 1, 2015    (EP) .................................... 15197374

(51) Int. Cl.
| | |
|---|---|
| C04B 28/10 | (2006.01) |
| C04B 35/636 | (2006.01) |
| C04B 35/043 | (2006.01) |
| C04B 35/632 | (2006.01) |
| C04B 28/30 | (2006.01) |
| C04B 35/63 | (2006.01) |
| C04B 35/101 | (2006.01) |
| C04B 24/04 | (2006.01) |
| C04B 24/10 | (2006.01) |
| C04B 111/00 | (2006.01) |
| C04B 103/22 | (2006.01) |
| C04B 103/24 | (2006.01) |

(52) U.S. Cl.
CPC ............ *C04B 28/105* (2013.01); *C04B 24/04* (2013.01); *C04B 24/10* (2013.01); *C04B 28/10* (2013.01); *C04B 28/30* (2013.01); *C04B 35/043* (2013.01); *C04B 35/101* (2013.01); *C04B 35/632* (2013.01); *C04B 35/6303* (2013.01); *C04B 35/6365* (2013.01); *C04B 2103/22* (2013.01); *C04B 2103/24* (2013.01); *C04B 2111/00146* (2013.01); *C04B 2111/00431* (2013.01); *C04B 2111/00551* (2013.01); *C04B 2235/3409* (2013.01); *C04B 2235/449* (2013.01); *C04B 2235/524* (2013.01); *C04B 2235/526* (2013.01); *C04B 2235/5212* (2013.01); *C04B 2235/5472* (2013.01)

(58) Field of Classification Search
CPC ......... C04B 24/04; C04B 24/10; C04B 28/10; C04B 28/105; C04B 28/30; C04B 35/043; C04B 35/632; C04B 35/6365; C04B 35/6303; C04B 35/101; C04B 2103/22; C04B 2103/24; C04B 2111/00431; C04B 2111/00551; C04B 2111/00146; C04B 2235/5472; C04B 2235/526; C04B 2235/524; C04B 2235/5212; C04B 2235/449; C04B 2235/3409
See application file for complete search history.

(56) References Cited

U.S. PATENT DOCUMENTS

| 3,751,571 A | 8/1973 | Burrows |
|---|---|---|
| 3,923,534 A | 12/1975 | Cassidy |
| 2005/0103235 A1 | 5/2005 | Harrison |

FOREIGN PATENT DOCUMENTS

| DE | 1471297 A1 | 3/1969 |
|---|---|---|
| EP | 1953487 A1 | 8/2008 |
| GB | 723924 A | 2/1955 |
| JP | S55-150972 A | 11/1980 |

OTHER PUBLICATIONS

International Search Report, dated Mar. 13, 2017, from corresponding PCT application No. PCT/EP2016/079082.

*Primary Examiner* — Anthony J Green
(74) *Attorney, Agent, or Firm* — Young & Thompson

(57) ABSTRACT

Disclosed is a hydraulically and chemically bonding refractory cement, which includes a caustic magnesia component having a BET specific surface area of at least 0.5 m$^2$/g, and a carboxylic acid component, wherein the carboxylic acid component consists of at least one carboxylic acid that is only slightly water soluble and/or has a low dissolution rate in aqueous solutions, and which carboxylic acid component is capable of generating at least one soluble magnesium salt upon contact of the cement with water. Also disclosed is a corresponding refractory material containing the magnesia cement and to uses thereof for the manufacture of products useful in various industries.

20 Claims, No Drawings

REFRACTORY MAGNESIA CEMENT

TECHNICAL FIELD OF THE INVENTION

The present invention relates to a refractory, hydraulically and chemically bonding magnesia cement, to refractory products containing said cement, and to industrial applications of said cement and said refractory products.

BACKGROUND OF THE INVENTION

The hydraulic-chemical bonding and refractory features of the magnesia cement according to the present invention are best understood when compared with state of the art cements. Known cements such as Portland cements or calcium aluminate cements and their numerous modifications are typical hydraulic bonding agents, or hydraulic binders. They set and cure as a result of chemical reactions of cement clinker with water and the formation of main bonding phases like calcium silicate hydrates, ettringite, brownmillerite and calcium aluminate hydrates, respectively. The calcium aluminate cements are mainly used for refractories and ceramics. However, the lime content of calcium aluminate cements lowers the refractoriness of alumina or basic refractory products. Limefree hydraulic cements, so called hydratable alumina, were developed and are used for corundum, alumina spinel, aluminum silicates and less often for basic refractories.

In contrast to hydraulic cements used for low temperature applications, there are several requirements regarding effective refractory and ceramic cements. The most important features are:
  bonding not only at ambient temperature but also in the temperature range close to the temperature where the formation of ceramic bonds occurs;
  high purity or contamination with only such constituents which do not decrease the refractoriness or high temperature strength;
  low and non-toxic emissions during heat-up;
  a phase composition assuring volume stability during cyclic heating and cooling.

Other known bonding agents used among others for refractories are primarily composed of soluble silicates, silica fume, phosphates and organic polymers or resins. Such bonding agents may comprise magnesia as an accelerator or even as the main component of the matrix and/or of the aggregates.

Alkali silicates, i.e. water glass, are another group of chemical binders for ceramics and refractories. Unfortunately, alkali silicate bonded products have only a minor refractoriness and resistance to chemical wear by e.g. slags, and are therefore mainly used for gunning or repair mixes but not for high temperature permanent or wear lining.

Phosphates are widely used as chemical bonding agents for basic and alumina refractories and ceramics. Hardening at ambient temperature is, however, often to slow, thus application of enhanced temperature or admixture of additives, e.g. one or more hydraulic bonding agents, is usually necessary. Also, the refractoriness of phosphate bonded products is not always satisfactory. Additionally, the phosphate content of the refractory lining of metallurgical furnaces can negatively influence the purity of products such as, for example, steel.

The hydraulic properties of lime and magnesia at low temperature, particularly of low particle size and/or calcined lime or magnesia, are generally known from textbooks and encyclopedia editions. Neither of the two compounds may be used alone as hydraulic cement because of the following reasons:
  Calcium hydroxide, the product of lime hydration, shows certain solubility and would dissolve in an excess of water leading to a decrease of strength.
  Very finely grinded magnesia or magnesia calcined at low temperature, usually obtained by calcination of magnesium hydroxide or magnesium carbonate, would hydrate very rapidly forming almost insoluble magnesium hydroxide, so called brucite. An uncontrolled setting would further result in deterioration of the mechanical properties of the end-product. Hydration of magnesia is significantly increased by the free lime content of MgO. One of the substantial issues of magnesia bonding according to the reaction $MgO+H_2O=Mg(OH)_2$ is a significant increase in volume, typically of about 45-55%, frequently of about 50 to 51%, resulting in a tendency for cracking and other defects during setting and drying. This property can especially be detrimental for magnesia cement-bonded basic refractories because magnesium hydroxide formed during cement hydration can act as brucite nuclei accelerating hydration of the magnesia matrix and aggregates. The decomposition of brucite during heat-up, accompanied by a usually 45-55%, typically 50 to 51% decrease in volume, would be a substantial drawback of pure magnesia cement-bonded refractories and ceramics.

The most commonly used magnesia cements are so-called Sorel cements which are based on reactive magnesia and magnesium salts such as sulphates and/or chlorides and which form the bonding matrix via magnesium oxychlorides and/or oxysulphates. Patent application US2005103235 describes properties and drawbacks of Sorel cements. Sorel cements are, however, less suitable for refractory and high temperature applications, due to a loss of strength and harmful emissions during heat-up.

The cements disclosed in US2005103235 have not been proved to be suitable for refractory applications, the nature of bonding is exclusively hydraulic and the main bonding species is brucite. Moreover, fluxes and mineralizing agents known for decreasing refractoriness are used for calcination, and grained reactive magnesia is the basic component of the cements. For that reason setting accelerators are necessary to achieve an acceptable setting time.

DE1471297 discloses and claims a refractory material which contains a cementitious mixture of non-plastic, fine magnesia and 0.1 to 15% of an aliphatic hydroxy tricarboxylic acid, preferably citric acid, or a salt thereof. However, it is known in the art that using magnesia of high specific surface area together with a well soluble, strongly complexing organic acid such as citric, would—after mixing with water—cause substantial difficulties in setting time adjustment and would deteriorate the rheological and the final mechanical properties of the end-product.

Similarly, U.S. Pat. No. 3,923,534 discloses a cold-settingrefractory composition comprising magnesia of low reactivity with a surface are of less than 2 $m^2/g$ and the anions of a carboxylic acid such as citric acid being a constituent of a water-soluble aluminium phosphate complex binding agent. However, as mentioned hereinbefore, the use of a well water-soluble organic acid such as citric acid would entail various undesired side-effects. Some disadvantages of phosphate binding agents for refractories have already been outlined before.

EP1953487 discloses a fire-resistant material consisting of known refractory raw materials, among others dead-burned and fused magnesia, bounded with a heatactivated binder being a carboxylic acid, especially hydroxy-carboxylic acid, or a mixture of different carboxylic acids. The disclosed fire-resistant material used for lining metallurgical vessels is, however, not a hydraulic binder which can set and harden after mixing with water at ambient temperature.

Another cementitious refractory composition comprising fine magnesia and 0.25 to 5% of a boron compound and a soluble chromium compound in a ratio of from 3:1 to 1:1.5, calculated as $CrO_3$ and $B_2O_3$, respectively, is known from GB723924. However, the use of chromic acid and soluble chromates for refractories is presently forbidden, because of alleged carcinogenic properties of Cr(VI) compounds.

U.S. Pat. No. 3,751,571 describes a refractory lining for coreless induction furnaces formed from castable refractory cement. The term cement as used therein relates to a cement composition consisting of refractory aggregates and bonding components comprising reactive magnesia and a small amount of an organic acid, i.e. oxalic acid. The oxalic acid used in example I is, however, readily soluble and forms sparingly soluble magnesium salts. From the disclosure of U.S. Pat. No. 3,751,571 it can be inferred that only a weak bonding of the cement was desired and in a certain temperature range, i.e. in the soft friable zone, this bonding completely disappeared.

JPS55150972 provides a cement for grinding stones for dental applications. Powders of magnesium oxide and an aqueous solution of a polyacrylic acid in the ratio of 3:1 are the main constituents of the cement. The polyacrylic acid forms chelate bonds with the molecules bridged by magnesium and the cement sets providing a high mechanical strength. This cement is not suitable, however, for high temperature applications because of the decomposition of polyacrylic acid at such temperatures.

BRIEF DESCRIPTION OF THE INVENTION

The present invention relates to a magnesia cement which is of high purity, low emission, suitable for heat-up and use for high performance refractories, ceramics, fireproof applications and construction, and which after mixing with water will set and harden even at ambient temperature. Both hydraulic and chemical bonding action of caustic and, optionally, finely grinded magnesia in the presence of poorly water-soluble carboxylic acids forming soluble magnesium salts, optionally in combination with one or more magnesia hydration retarding agents, results in the development of high strength and allows for adjusting the setting time. No additional metal salts or other bonding additives are necessary to achieve a firm bonding. An environmentally friendly manufacturing process of said cement, using commonly available raw materials, is also disclosed herein.

The preferred starting material for caustic magnesia is a fine powder of magnesium hydroxide obtained e.g. by precipitation, spraying or grinding. High specific surface area caustic magnesia, calcined at temperatures below 1100° C., is required. Said caustic magnesia may then be blended with finely grinded dead burned, hard burned or fused magnesia, with slightly water-soluble carboxylic acids, and optionally with one or more hydration-retarding agents. Refractory products containing the present magnesia cement are suitable for different placing and lining techniques such as vibratory, self-flowing or gunning techniques and can be used as concretes, castables, slurries and other mixes as well as for the production of pre-cast shapes applied in the refractory, ceramic and other industry branches.

The invention claimed in the independent claims therefore relates to a refractory magnesia cement and its use, wherein the magnesia cement comprises caustic magnesia of high specific surface area (S.S.A.), and one or more slowly and/or slightly water-soluble carboxylic acids forming at least one soluble magnesium salt in aqueous solutions. For selected products or applications magnesia hydration retarding agents may be added, too. Further useful embodiments of the invention are defined and claimed in the dependent claims.

DETAILED DESCRIPTION OF THE INVENTION

Magnesia cement for refractory, ceramic and construction use must meet certain requirements. At first, the cement should be suitable for high performance mixes and formulations and should not negatively interfere with the effectiveness of dispersants and water reducing agents. It is known in the art, that readily soluble acids and salts forming ionic species, especially of higher charge and at higher concentration, can largely hinder an effective dispersion. Such effect is particularly observed when electrosteric or electrostatic dispersants are used. A properly dispersed, low water cement formulation is a key feature to obtain high strength, low porosity concrete products.

A second issue is how to control the magnesia-carboxylic acid reaction rate and the extent of magnesia hydration in order to achieve a proper setting and hardening time and a crack-free drying and heat-up.

It is therefore an object of the present invention to provide a useful solution to these issues and demands. Fine grained and/or high specific surface area magnesia is promoting a firm bonding but it also goes with a high acid/base reaction rate, high magnesia hydration rate, and consequently flesh setting or undesirable rheological properties, if readily soluble carboxylic acids are used in combination with such magnesia cements.

Surprisingly, it has been found by the present inventor, that a mixture comprising slightly and/or slowly soluble carboxylic acids together with high specific surface area caustic magnesia, and, optionally, together with at least one of a finely grained dead burned magnesia, a finely grained fused magnesia, and a magnesia hydration retarding agent, can result in a magnesia cement of adjustable setting time and further desirable properties. Both kinds of ingredients, i.e. the carboxylic acid and magnesia hydration retarding agent, prevent the desired cement composition from an overly rapid hydration of the magnesia component(s) and from an undesirable epitaxial growth of brucite on MgO crystals that would otherwise result in crack formation during drying and heat-up. At the same time they substantially facilitate a smooth and even dispersion of the caustic magnesia and optionally of further magnesia components among the mixture of ingredients of the respective magnesia cements or of corresponding refractory material that contains such a magnesia cement.

The surprising finding that sparingly soluble carboxylic acids can advantageously be used for supplementing magnesia cements seems to teach away from the general knowledge in the art. This may perhaps be due to a likely prejudice in the art, according to which sparingly soluble acids might not be sufficiently reactive. Convincing evidence of the desirable low or moderate hydration characteristics of the present magnesia cement and of a refractory material containing said cement during setting, drying and heat up was obtained using a powerful hydrothermal autoclave test at 150° C., confirming the development of crack-free concrete samples, as disclosed in the examples hereinafter. This test is better suitable for predicting a crack-free heat-up than the volume stability test, wherein a sample is heated in a humid atmosphere at 100° C. and its expansion determined thereafter, as for example used in DE1471297.

In a first embodiment of the invention a magnesia cement is provided that is suitable for strong hydraulic-chemical bonding of refractory, ceramic and/or construction raw material. For that purpose caustic magnesia of high specific surface area is required. In this context, it is more important to pay attention to the particle size or specific surface area of the caustic magnesia than to the temperature of magnesia calcination, in contrast to what is known for such magnesia cements that are only hydraulic bonding agents with brucite as a main bonding phase. According to the present invention, the caustic magnesia having a high specific surface area (S.S.A.), i.e. an S.S.A. of greater than about 0.5 $m^2/g$, preferably of about 3.0 to about 80 $m^2/g$, and optionally of greater than 80 and up to 150 $m^2/g$, can be obtained by calcination of magnesium compounds at temperatures of greater than 350° C. and up to 1100° C.

By using a blend of caustic magnesia of different specific surface areas, together with finely grinded magnesia, and optionally other components of the cement, in combination with one or more carboxylic acids of low solubility and/or low dissolution rate in aqueous solutions, it is possible to adjust the setting and hardening times within a wide range. In doing so, at least a part of the carboxylic acid component upon contact with water generates or turns into at least one alkaline earth metal salt of high water-solubility such as either or both of a magnesium and calcium salt. The carboxylic acids of low dissolution rate can also be provided by way of soluble organic acid particles coated by sparingly or slowly water-soluble protective layers. The slowly dissolving carboxylic acids such as, e.g., fumaric acid and/or adipic acid, act as long term retardants of magnesia hydration and, simultaneously, work at least during the first stage of setting as chemical bonding agents in the formation of soluble magnesium and calcium salts. The weight ratio of total caustic magnesia to total carboxylic acid may be varied within a range of from about 1:1 to about 500:1.

Suitable carboxylic acids may be selected from the group consisting of organic acids having a water-solubility at 20° C. of less than about 50 g/L, typically of less than about 20 g/L, and optionally of about 0.5-5 g/L. Additional selection criteria may comprise at least one of an availability as a mass product, availability at a reasonable price, and failure to produce toxic emissions and/or undesired thermal decomposition products when used for refractory or ceramic applications. Accordingly, the slightly soluble carboxylic acid may be selected from the group consisting of fumaric acid, adipic acid, benzoic acid, phtalic acid, phtalic anhydride, and sorbic acid. A person of skill in the art will be able to select further suitable carboxylic acids without deviating from the spirit of the present invention.

Supplementing the magnesia cement with one or more hydration retarding agents may significantly contribute to adjusting satisfactory setting times and to improving resistance of the present magnesia cement and of a corresponding refractory material that contains a said cement against excessive magnesia hydration during setting and against crack formation during drying and heat-up. The one or more hydration retarding agents may be added in a total amount of from 0.1 to 30 wt %, relative to the total magnesia content. They may be chosen from the group consisting of mono-, di- and polysaccharides, sugar alcohols, mineral acids and their salts, and may typically be selected from the group consisting of glucose, lactose, saccharose, mannitol, boric acid, and salts of boric acid.

Both the carboxylic acids and the hydration retarding agents do not disturb the dispersion of the cement slurries or water cement formulations, due to either their low solubility and/or their non-ionic nature and/or the low concentrations required.

In another embodiment of the invention the caustic magnesia cement is blended with finely grinded magnesia fired at a high temperature, known as hard fired, dead burned or fused magnesia. If grinded to an average particle size $d_{50}$ of less than 45 μm, such finely grinded magnesia can also react with the carboxylic acids and thus contribute to adjusting the setting time and especially the strength of cement bonding. A combination of a high amount of finely grinded magnesia and a low amount of caustic magnesia, for example a combination of about 70 to about 99% by weight of finely grinded magnesia and about 30 to about 1% by weight of caustic magnesia, relative to the total magnesia content, can be useful e.g. for slow setting and hardening cements. The total amount said finely grinded magnesia may be adjusted up to about 97 wt % of the total dry mass of the refractory cement composition.

It is known in the art that the temperature of calcination of magnesium compounds, typically of magnesium hydroxide $Mg(OH)_2$ or magnesium carbonate $MgCO_3$, determines the reactivity of the resulting caustic magnesia, MgO. For the purposes of the present invention, the calcination temperature can be chosen in a wide temperature range below 1100° C., i.e. in a temperature range of between 350° C. and 1100° C., preferably of between 750° C. and 900° C. Caustic magnesia produced by calcination at temperatures below 750° C. seems to have a tendency of reacting very fast with water and carboxylic acids, for which reason adjusting a desired or appropriate setting time can turn difficult. This is particularly so when using caustic magnesia having a high specific surface area.

At this occasion it should be mentioned that predicting the reactivity of caustic magnesia only in consideration of the selected temperature chosen for calcination will most likely not lead to satisfactory results. This is, because the reactivity of caustic magnesia also significantly depends on the rate of heating, of the retention time at the highest calcination temperature, and of the rate of cooling. In preliminary tests, numerous caustic magnesia samples obtained by calcination in an upper temperature range at a fast heating rate and at a short retention time were more reactive than magnesia samples calcined in a lower temperature range and at a long retention time.

One way of measuring the reactivity of caustic magnesia is by determining the setting time of cements containing the experimental caustic magnesia samples.

Another indicator for caustic magnesia reactivity is the known citric acid activity test. The results of this test are influenced both by the specific surface area of the magnesia samples and the temperature of calcination. The majority of caustic magnesia samples used for the cement compositions according to the present invention exhibited a pH change, i.e. citric acid activity, between 25 and 50 seconds after the onset of the test (test conditions: T=30° C.; 2.0 g magnesia samples; 100 ml test solution: citric acid 25 g/l, sodium benzoate 0.5 g/l, phenolphtalein 0.1 g/l). The results of the citric acid activity test alone did not allow, however, for accurately predicting the setting time of cement compositions containing the experimental caustic magnesia.

It is a particular advantage of the magnesia cement and of products containing said cement made in accordance with the present invention that the effective rate and extent of reaction between magnesia and water can be controlled not only by the temperature and further parameters of magnesia calcination but also by the selection and amount of carboxylic acids and hydration retarding agents used.

Carboxylic acids suitable for the purposes of the present invention are either sparingly water-soluble or dissolve in aqueous solvents at rather low rates. Low solubility in this context means a solubility of about 0.5 to about 50 g/L, preferably of about 1 to about 20 g/L, at a temperature of 20° C. Slow dissolution means a dissolution rate of the carboxylic acid in an aqueous solution at 20° C. of about 1 to about 50 g per liter and hour, typically of about 2 to 10 g/L/h. Slowly dissolving organic acids may, however, also comprise more readily water-soluble organic acids that are coated by one or more protective layers or that are integrated in a sustained release matrix in a way such as to render them slowly dissolvable in aqueous solvents. Suitable retard or sustained release agents used for depot formulations and drug coatings are known in the art and particularly in the pharmaceutical industry. Accordingly, virtually any organic acid can be used for the purposes of the present invention as long as it complies with the requirement of low solubility or slow dissolution in aqueous solvents and does not decompose upon heating into toxic or otherwise harmful substances. Depending on the sustained release agent used for a specific purpose the slow release and subsequent dissolution of the carboxylic acid is achieved by either chemical degradation of the sustained release coating or matrix, or by hydration and swelling of the usually polymeric sustained release matrix resulting in increasing leakiness of the matrix.

Such retard or sustained release agents may, for example, be selected from the group consisting of hydrogenated vegetable oils, beeswax, fatty acids, long chain fatty alcohols, glycerides, oils, ethyl cellulose, stearic acid and its salts, paraffin, carnauba wax, talc, polyamides, polycarbonates, polyalkylenes, polyalkylene glycols, polyalkylene oxides, polyvinyl alcohols, polyvinylphenol, polyvinyl ethers, polyvinyl esters, polyvinyl halides, polyvinylpyrrolidone, polyglycolides, polysiloxanes, polyurethanes, polystyrene, polylactides, polyvinyl acetate, polystyrene, polymers of acrylic and methacrylic esters, celluloses, cellulose derivatives or mixtures thereof.

In an embodiment of the invention the caustic magnesia cement may be supplemented with functional additives. Such cement compositions are frequently called cement pre-mixes and can be useful for numerous applications, e.g. for the preparation of ready-for-use cement slurries or other cement compositions containing a high amount of the magnesia cement.

Functional additives are typically added in amounts of up to 20 wt %, relative to to the total dry mass of the refractory material, e.g. in amounts of from 0.1 to 15 wt %. They can be chosen from the group consisting of dispersing agents, wetting agents, fluxes, and agents for a crack-free heat-up. The dispersing agents may be selected from the group consisting of polyelectrolytes, polycarboxylates, and superplasticizers. The wetting agents may be selected from the group consisting of soaps and ether derivatives, and the fluxes may be selected from the group consisting of low melting compounds and eutectic mixtures promoting sintering. The agents for a crack-free heat-up may be selected from the group consisting of organic fibers and metallic fibers, wherein the fibers are preferably capable of melting and/or decomposing and/or reacting at temperatures below 100° C. with at least one of the other constituents of the magnesia cement or of a corresponding refractory material containing a said cement.

For various embodiments of the invention it may be preferred that the dispersants and the water reducing agents be compatible not only with the magnesia cement but also with the additional refractory and ceramic material optionally admixed for predetermined applications of the end product.

Addition of fluxes such as e.g. boron oxide and/or lithium oxide is recommended if sintering of the magnesia cement and of the refractory or ceramic material is required in a certain temperature range, e.g. below 1000° C. Most suitable for that purpose are transient fluxes, i.e. fluxes forming a liquid phase and promoting sintering at lower temperatures, while decomposing, evaporating, or forming so-called solid-solutions at higher temperatures resulting in the formation of ceramic materials having high refractoriness.

It is known in the art that a crack-free heat-up of high density cement bonded refractory and ceramic materials usually requires the presence of fibers, e.g. microfibers. After melting and decomposing of the microfibers a network of pores remains facilitating the transport and evaporation of water and preventing a high water partial pressure inside cement bonded products. This issue is especially important in connection with the heat-up of magnesia cements due to the strong influence of the temperature and water partial pressure on the hydration rate of magnesia and on the epitaxial growth of brucite on magnesia crystals typically leading to a high crystallization pressure and cracks. Frequently used fibers in the concrete industry are polyethylene and polypropylene fibers. However, such fibers are not perfectly suitable for refractory and ceramic materials based on magnesia, because MgO hydration is very fast already at temperatures below 100° C. According to the present invention, it is therefore preferred to use fibers that are able to melt and/or decompose and/or chemically react already at temperatures below 100° C. They are better suitable for preventing cracks and possible explosions during heat-up and may be selected from the group consisting of fibers including microfibers, made of aluminum, aluminum alloys, or of low melting polyvinyl alcohol (PVA).

Production of Magnesia Cement:

In an embodiment of the invention, the starting materials to obtain calcined magnesia are fine powders of magnesium compounds such as magnesium carbonate or magnesium hydroxide, preferably of magnesium hydroxide. Suitable magnesium hydroxide powders are commercially available. Depending on the respective requirements, magnesium hydroxide powder grades showing a MgO content after calcination of from about 90 to 99% by weight may be chosen for many applications. If caustic magnesia of especially high specific surface area is required, a double calcination product is preferred. In such case, caustic magnesia obtained after a first round of calcination will be re-hydrated to $Mg(OH)_2$ at a temperature near, i.e. above or below, 100° C. and then subjected to a second round of calcination. The calcination is typically performed continuously or semi-continuously in rotary kilns or multiple-heart furnaces but can also be realized batch-wise in stationary or other furnaces.

Numerous caustic magnesia products available on the market have been calcined at temperatures of between 900 and 1100° C. Using such caustic magnesia alone could make it difficult for some applications to properly adjust a desired or predetermined, usually sufficiently rapid, setting time of the cement. This problem can be circumvented by admixing a portion of caustic magnesia that has been obtained by calcination at a temperature below 900° C. and optionally between 750° C. and 900° C., of a magnesium compound which is a fine powder before calcination and which preferably has an average particle size of less than 45 µm, e.g. of between 20 to 40 µm, before calcination, and/or which magnesium compound has a specific surface area of greater than 0.4 m$^2$/g, e.g. of from 0.5 to 20.0 m$^2$/g, before calcination as obtainable for example by precipitation, spraying, grinding or jet milling. Calcination of such a fine powder of a magnesium compound typically yields caustic magnesia having a specific surface area of at least 0.5 m$^2$/g, usually of 3.0 to 80.0 m$^2$/g, and optionally of up to 150 m$^2$/g.

Where the carboxylic acid used according to the present invention is solid at 20° C. fine grinding of said carboxylic acid down to an average particle size of at least 60 µm or less is preferred. This takes into account the low solubility or slow dissolution rate of the respective carboxylic acid and also the fact that non-dissolved carboxylic acid remaining as a particulate matter in the matrix after setting, could possibly exert a negative effect on the strength and porosity of the resulting cement bonded products. Therefore, in some embodiments of the invention an average particle size of the admixed carboxylic acid(s) of even less than 10 µm, e.g. of between 1-5 µm, may be necessary to avoid this effect.

Where grinding of one or more components of a magnesia cement composition of the present invention is recommendable or required, co-grinding of those components may be performed. No grinding for blending purposes is recommended where fibers are present as functional additives, because of their possible damage.

Ready-for-use cement compositions have various advantages over the use of single cement components and their later combination at the site of use. For example, the bonding will be more effective due to intimate contact of the pre-mixed reaction components. Also, the protection of calcined and finely grinded magnesia against hydration during storage is much better in the ready-for-use cement composition, since it is already thoroughly mixed with one or more carboxylic acids and optional hydration retarding agents.

An embodiment of the invention relates to a useful particulate refractory material containing on one hand the components of a refractory magnesia cement prepared in accordance with the present invention, namely either by way of a pre-mixed ready-for-use cement or by way of separately obtained single components of a said cement, and on the other hand particulate refractory, ceramic and/or construction raw materials, one or more functional additives, and optionally additional hydration retarding agent. The refractory and ceramic raw materials may comprise one or more metal oxides as well as compounds and mixtures derived therefrom, particularly compounds selected from the group consisting of alkaline metals, MgO, CaO and other alkaline earth metal oxides, Cr2O3, chrome ore, Al2O3, spinels, SiO2, silicates, TiO2, ZrO2, oxides of rear earth metals, oxides of iron group metals, oxides of other transition metals. Further refractory and ceramic material additives may be selected from the group consisting of non-oxide refractory and ceramic raw materials such as carbon, graphite, nitrides, and carbides. Particulate additives of construction raw material may comprise one or more typical components selected from the group of common construction concretes, timber or wood materials, and other renewable, usually fibrous, raw materials.

Such a refractory cement product may comprise at least 1% by weight and up to 99.5 wt % of a refractory magnesia cement, together with at least one of the the following components:
  0.1 to 99 wt % of at least one of a refractory, ceramic, and construction raw material, wherein said raw material has an average grain size of from about 60 µm to about 50 mm;
  0.1 to 99 wt % of at least one of a refractory, ceramic, and construction raw material, wherein said raw material has the average grain size of from about 0.1 µm to about 60 µm;
and optionally also
  0.3 to 15 wt % of one or more components selected from the group consisting of functional additives and hydration retarding agents.

Where the term "magnesia cement" is used herein it shall refer to either the pre-mixed, e.g. ready-for-use magnesia cement, or to the entirety of the single components of which a said magnesia cement is comprised, unless stated otherwise or unless a different meaning is derivable from the given context. In order to practice the present invention one may either use a pre-mixed ready-for-use magnesia cement or, alternatively, merely the constituents of a said cement which constituents may be separately available, in order to combine them at a later time, e.g. at the site of use, optionally together with further components such as functional additives and/or particulate material.

It will be apparent to those skilled in the art, that grain sizes of a particulate refractory material containing a magnesia cement according to the present invention are usually encompassed by the terms "fine" grain, "fine/coarse" grain and "coarse" grain. The refractory, ceramic or construction raw materials suitable for this purpose in line with the invention are not restricted to grains spherical in shape. The grains may also be irregular in shape, e.g. disc shaped, rod-shaped, or bladed, and also fibers and tubes may be included. An extended definition of particle size can be applied to irregular shaped, i.e. non-spherical, particles, based on replacing a real particle with an imaginary sphere that has the volume identical with the irregular shaped particle. This volume-based particle size definition allows for the determination of an average grain size of refractory, ceramic or construction raw materials being irregular in shape and is valid for the quantification of grain size distribution.

For some applications it may be useful to provide a refractory material, typically a particulate refractory material, which contains a magnesia cement or—if the magnesia cement is supplied by way of separate components—all of its constituents, in line with the present invention and, in addition, additives for chemical, mechanical or electrical modification. Such modifying additives are not primarily intended for influencing the bonding properties of the cement but rather to modify properties such as color, wettability, mechanical properties, electrical conductivity, and/ or magnetic properties. Various chemical elements and compounds, metal powders and/or metal fibers, semiconductors, magnetic materials, and organic materials can suitably be used for this purpose.

The refractory, ceramic and/or construction raw material referred to above can be selected from any ceramic or refractory raw material such as oxide, non-oxide, synthetic, natural mineral, dense, or insulating material, if bonding with the present magnesia cement is meaningful and desired. Construction raw materials like common components of concretes, i.e. gravel, sand and other fine or coarse components can be bonded using cement of this invention as well. An advantageous feature of the present invention is that effective bonding occurs even with only low amounts of magnesia cement.

The present magnesia cement and a corresponding refractory material containing such a magnesia cement, or all of its constituents if supplied separately, in accordance with the present invention may advantageously be used for the application as or the preparation of refractory products such as concretes, suspensions, self-flowing or thixotropic castables, slip casting, tape casting, coating compositions, shotcrete mixes, gunning mixes, ramming mixes, repairing mixes, injection mixes, mortars, and bonding or joining agents. Such refractory products are particularly useful in industrial applications for monolithic lining, production of precast shapes, prefabricated elements, functional products, fireproof products, insulating products for furnaces, vessels or other devices, or for the manufacture of refractory or fireproof products used in numerous industry branches including refractory, steel, non-ferrous metals, cement, glass, ceramic, electronic, construction and other industry branches.

The following examples and comparative examples shall further illustrate the present invention without limiting the invention to the specific embodiments disclosed therein.

Example 1

Disclosed is a magnesia cement comprising as the main constituents caustic magnesia, grade marked A, and fine grinded fused magnesia. The caustic magnesia A was obtained by calcination of a magnesium hydroxide at 760° C. The magnesium hydroxide had a BET specific surface area (BET S.S.A) of 4.6 m$^2$/g and was industrially manufactured by hydration of magnesium powder obtained by pyrohydrolysis of magnesium chloride. The BET (Brunauer-Emmett-Teller) method for determination of the specific surface area of fine particulate matter is known in the art. The caustic magnesia grade A is characterized by the following composition and specific surface area: MgO 98.7%, CaO 0.3%, SiO$_2$<0.1%, by weight, BET S.S.A=41.9 m$^2$/g. The cement is composed as follows (Table 1):

TABLE 1

| | |
|---|---|
| Caustic magnesia A | 47 wt % |
| Fused magnesia 97.5% MgO <0.045 mm | 47 wt % |
| Fumaric acid <0.045 mm | 3 wt % |
| Glucose powder | 3 wt % |
| Total dry mass | 100 wt % |
| Super plasticizer (dispersant) | +30 wt % |

Super plasticizers are known in the art. For the experimental compositions disclosed in the examples a modified carboxylate (Sika Schweiz AG) was used.

Example 2

Disclosed is a magnesia cement the main constituents of which are two caustic magnesia grades. One grade, marked A, calcined at 760° C., is the same as in example 1. The second grade, marked B, has a BET S.S.A=20.5 m$^2$/g, was industrially manufactured by calcination of natural magnesites after a flotation process at temperatures of up to about 1000° C. The caustic magnesia B is characterized by the following composition: MgO 98.1%, CaO 0.8%, SiO$_2$ 0.3%, Fe$_2$O$_3$ 0.5% by weight. The cement is composed as depicted in Table 2:

TABLE 2

| | |
|---|---|
| Caustic magnesia A | 32 wt % |
| Caustic magnesia B | 64 wt % |
| Fumaric acid <0.045 mm | 2 wt % |
| Glucose powder | 2 wt % |
| Total dry mass | 100 wt % |
| Super plasticizer (dispersant) | +2 wt % |

Example 3

Disclosed is a fine-grained refractory material comprising as the main constituents refractory magnesia and caustic magnesia grade A. The refractory material consists essentially of the following components (Table 3):

TABLE 3

| | |
|---|---|
| Fused magnesia 97.5% MgO 0.06-0.1 mm | 2 wt % |
| Fused magnesia 97.5% MgO <0.045 mm | 78 wt % |
| Caustic magnesia A | 15 wt % |
| Fumaric acid <0.045 mm | 2 wt % |
| Glucose powder | 1.4 wt % |
| Super plasticizer | 1.5 wt % |
| PVA fibers: diameter 11 μm, length 4 mm, dissolving temp. 68° C. | 0.1 wt % |
| Total dry mass | 100 wt % |

Example 4

Disclosed is a fine-grained refractory material comprising as the main constituents refractory magnesia and caustic magnesia grade C. The caustic magnesia C was obtained by autoclave hydration of caustic magnesia B at 150° C., 2 hours, followed by a second calcination at 760° C. The BET S.S.A of caustic magnesia C equals 72.0 m$^2$/g. The refractory material consists essentially of the following components (Table 4):

TABLE 4

| | |
|---|---|
| Fused magnesia 97.5% MgO 0.06-0.1 mm | 2 wt % |
| Fused magnesia 97.5% MgO <0.045 mm | 78 wt % |
| Caustic magnesia C | 15 wt % |
| Fumaric acid <0.045 mm | 2 wt % |
| Glucose powder | 1.4 wt % |
| Super plasticizer | 1.5 wt % |
| PVA fibers: diameter 11 μm, length 4 mm, dissolving temp. 68° C. | 0.1 wt % |
| Total dry mass | 100 wt % |

Example 5

Disclosed is a coarse/fine-grained particulate refractory material comprising as the main constituents refractory magnesia and caustic magnesia grade A. The refractory material consists essentially of the components listed in Table 5:

TABLE 5

| | |
|---|---|
| Fused magnesia 97.5% MgO 2-4 mm | 20 wt % |
| Fused magnesia 97.5% MgO 0.3-2 mm | 40 wt % |
| Fused magnesia 97.5% MgO 0-0.3 mm | 7.7 wt % |
| Fused magnesia 97.5% MgO <0.045 mm | 25 wt % |
| Caustic magnesia A | 5 wt % |
| Fumaric acid <0.045 mm | 0.7 wt % |

TABLE 5-continued

| | |
|---|---|
| Glucose powder | 0.7 wt % |
| Super plasticizer | 0.5 wt % |
| Lithium carbonate (flux) | 0.2 wt % |
| Boron oxide (flux) | 0.1 wt % |
| PVA fibers: diameter 11 μm, length 4 mm, dissolving temp. 68° C. | 0.1 wt % |
| Total dry mass | 100 wt % |

Example 6

Disclosed is a coarse/fine-grained particulate refractory material comprising as the main constituents quartz sand and caustic magnesia grade A. The refractory material consists essentially of the components listed in Table 6:

TABLE 6

| | |
|---|---|
| Gravel 2-4 mm | 20 wt % |
| Quartz sand 1-2 mm | 28 wt % |
| Quartz sand 0.3-1 mm | 11 wt % |
| Quartz sand 0.1-0.7 mm | 20 wt % |
| Caustic magnesia A | 7 wt % |
| Dead burned MgO <0.045 mm | 5 wt % |
| Silica Fume | 7 wt % |
| Fumaric acid < 0.045 mm | 0.6 wt % |
| Glucose powder | 0.8 wt % |
| Super plasticizer | 0.6 wt % |
| Total dry mass | 100 wt % |

Example 7

Disclosed is a coarse/fine-grained particulate refractory material comprising as the main constituents alumina raw materials and caustic magnesia grade A. The alumina raw materials were supplied by Almatis B.V. The refractory material consists essentially of the components listed in Table 7:

TABLE 7

| | |
|---|---|
| Sintered Alumina 99% Al2O3 1-3 mm | 28.5 wt % |
| Sintered Alumina 99% Al2O3 0.5-1 mm | 20 wt % |
| Sintered Alumina 99% Al2O3-0.3 mm | 18 wt % |
| Sintered Alumina 99% Al2O3-20 μm | 11 wt % |
| Calcined Alumina 99% Al2O3 d50 <3 μm | 17 wt % |
| Caustic magnesia A | 4 wt % |
| Fumaric acid <0.045 mm | 0.5 wt % |
| Glucose powder | 0.5 wt % |
| Super plasticizer | 0.5 wt % |
| PVA fibers: diameter 11 μm, length 4 mm, dissolving temp. 68° | 0.05 wt % |
| Total dry mass | 100 wt % |

Example 8—Comparative Example

Comparative example 8 is disclosed to demonstrate the inferior properties of cement based only on a caustic magnesia without carboxylic acids and hydration retarding agents.

TABLE 8

| | |
|---|---|
| Caustic magnesia A | 100 wt % |
| Dispersant (super plasticizer) | +3 wt % |

The subsequent comparative Examples 9 and 10 are presented to compare some properties of similar state-of-the-art cementitious refractory material, i.e. as disclosed in DE1471297, with the refractory material of Example 5 of the present invention. The magnesia fines used in the two comparative examples was a dead burned grade, 97.2% MgO, manufactured from see water. These fines had an average particle size d50=15 μm and a specific surface area determined by the Blaine method of 3075 cm$^2$/g, well in accordance with the magnesia used in DE1471297. The composition of the magnesia aggregate in the comparative examples 9 and 10 was similar to the one in example 5. The citric acid in the comparative examples was dissolved in water before mixing with the dry components.

Example 9—Comparative Example

TABLE 9

| | |
|---|---|
| Fused magnesia 97.5% MgO 2-4 mm | 20 wt % |
| Fused magnesia 97.5% MgO 0.3-2 mm | 40 wt % |
| Fused magnesia 97.5% MgO 0-0.3 mm | 9.75 wt % |
| Dead burned magnesia fines 97.2% MgO | 30 wt % |
| Citric acid (dry mass) | 0.25 wt % |
| Total dry mass | 100 wt % |

Example 10—Comparative Example

TABLE 10

| | |
|---|---|
| Fused magnesia 97.5% MgO 2-4 mm | 20 wt % |
| Fused magnesia 97.5% MgO 0.3-2 mm | 35 wt % |
| Fused magnesia 97.5% MgO 0-0.3 mm | 8.35 wt % |
| Dead burned magnesia fines 97.2% MgO | 30 wt % |
| Magnesium sulfate heptahydrate | 1.8 wt % |
| Silica Fume | 4.5 wt % |
| Citric acid (dry mass) | 0.35 wt % |
| Total dry mass | 100 wt % |

Materials and Methods:

The dry components of the magnesia cement and of the refractory material referred to in Examples 1 to 7, and those in the comparative Examples were dry mixed first and then combined and mixed with the amount of water indicated in Table 11 at ambient temperature, i.e. in a temperature range of about 20-25° C., and casted into cylindrical forms. The setting time was measured by a needle penetration method. The samples de-formed after 12 hours were dried for 48 h at ambient temperature before subjecting the samples to cold crashing strength (CCS) determination and a hydration test in an autoclave at 150° C. The time in 15 hours of the crack-free behaviour of the magnesia cement and of the refractory material after the hydration test is given in Table 11. Samples of the refractory material containing magnesia cement were also tested for heat-up behavior up to 1000° C. with an average heating rate of 150° C./hour. Samples of the refractory material referred to in examples 3 to 5, i.e. containing PVA microfibers, did not exhibit any cracks or damage after heat-up. Samples of the same refractory material but without fibers were, on the other hand, seriously damaged.

The results of the tests conducted with samples produced in line with Examples 1-7 and comparative Examples 8-10 are listed in Table 11 below.

TABLE 11

| Examples | Water added [wt. %] | Setting time [min] | CCS [MPa] | Hydration test 150° C., [h] |
|---|---|---|---|---|
| 1 | 32.5 | 210 | 36.2 | |
| 2 | 35.0 | 135 | 32.5 | |
| 3 | 13.5 | 420 | 57.7 | >70 |
| 4 | 16.0 | 190 | 52.7 | >70 |
| 5 | 6.5 | 120 | 40.1 | >50 |
| 6 | 7.0 | 600 | 24.6 | |
| 7 | 5.9 | 65 | 38.7 | |
| 8 (comp.ex.) | 70.0 | 720 | 8.0 | |
| 9 (comp.ex.) | 8.0 | >2880 | | |
| 10 (comp.ex.) | 7.0 | 2400 | | 40 |

CONCLUSIONS

Examples 1 and 2 teach that for providing a cement according to the present invention either caustic magnesia alone or a mixture of caustic magnesia and a fines of high-fired magnesia, e.g. fused magnesia, can be used. Both variants of caustic magnesia, e.g. calcined at 760° C. or calcined at 1000° C., can be used, preferably in combination, provided a high BET S.S.A. is present. When comparing the magnesia cements of examples 1 and 2 with the cement of comparative example 8 it becomes apparent that the lack of carboxylic acid and of a hydration retarding agent results in inferior properties, among others in a much too long setting time and a high water demand.

The only difference of the fine-grained refractory material referred to in Examples 3 and 4 is the use of different caustic magnesia grades, i.e. marked A and C. Despite of the same calcination temperature of 760° C., the cement with caustic magnesia C of higher BET S.S.A. has a much faster setting time. This comparison teaches that a calcination temperature of more than 760° C. may be advantageous, if magnesia of high BET S.S.A is used and a longer setting time is required.

The coarse/fine-grained refractory material according to Example 5 indicates the suitability of the magnesia cement provided by the present invention for numerous basic refractory products. Already low amounts of the cement allow a firm bonding of aggregate and fines and assure satisfactory hydration resistance and crack-free heat-up, as checked and confirmed by the autoclave hydration test at 150° C.

Example 6 teaches that bonding of non-basic materials, in this case quartz sand and gravel, can also be realized using a magnesia cement in line with this invention.

Example 7 discloses a practically relevant and useful application of the magnesia cement of this invention for alumina based products. Such a low cement, spinelforming castable is almost lime free, firmly bonded and of high refractoriness.

It should be mentioned that the grain size and raw material composition in all of the above examples was not optimized. Therefore, even better physical and chemical properties can be expected when using optimized recipes.

Comparative examples 9 and 10 are helpful to demonstrate another concept of bonding and to support the advantages of the present magnesia cement and of the corresponding refractory material containing said cement over the cementitious refractory material disclosed in DE1471297.

The bonding of the cementitious material described in DE1471297 requires the use of dead burned, hard burned or intermediate burned magnesia together with a tricarboxylic acid or its salt. The consequence of such a concept is that hydraulic bonding, i.e. the formation of brucite, is very slow up to extremely retarded and chemical bonding by the salts of citric acid prevails. This can be inferred from the very long setting time for the composition used in comparative example 9. Such a long setting time is not acceptable for high productivity operations.

Other than in DE1471297, the employment of caustic magnesia is essential according to the present invention in order to ensure hydraulic as well as chemical bonding for achieving a proper setting time, as best shown in example 5. Despite the admixture of additional bonding agents like magnesium sulfate and fumed silica to a magnesia refractory material disclosed and recommended by DE1471297 and repeated in comparative example 10, the setting time of the resulting composition was still too long. The undesirable side effects of magnesium sulfate and silica fume on basic refractories have already been mentioned earlier. Also, a direct comparison of the hydration resistance of a refractory material that contains magnesia cement or its constituents prepared in line with this invention (i.e. Example 5) and a cementitious refractory magnesia material according to DE1471297 (i.e. comparative example 10), even in the instantly improved variant, leaves no doubt about the superiority of the present invention, as determined among others by way of the autoclave hydration test.

What is claimed:

1. A hydraulically and chemically bonding refractory magnesia cement, which comprises a caustic magnesia component having a BET specific surface area of at least 0.5 $m^2/g$, and a carboxylic acid component, wherein the carboxylic acid component consists of at least one carboxylic acid that is only slightly water soluble and/or has a low dissolution rate in aqueous solutions, wherein the carboxylic acid component has a solubility at 20° C. of from 0.5 to 50 g/L, or a dissolution rate in an aqueous solution at 20° C. of from 1 to 50 g/L/h.

2. The magnesia cement of claim 1, wherein the specific surface area of the caustic magnesia is within a range of from 0.5 to 150 $m^2/g$.

3. The magnesia cement of claim 1, wherein the carboxylic acid component has a solubility at 20° C. of from 1 to 20 g/L, or a dissolution rate in an aqueous solution at 20° C. of from 2 to 20 g/L/h.

4. The magnesia cement of claim 1, wherein the weight ratio of caustic magnesia component to carboxylic acid component is within a range of from 500:1 to 1:1.

5. The magnesia cement of claim 1, wherein it comprises one or more additional ingredients selected from the group consisting of a magnesia hydration retarding agent, a finely ground hard-burned magnesia, a finely ground deadburned magnesia, and a finely ground fused magnesia.

6. The magnesia cement of claim 5, wherein it comprises said at least one hydration retarding agent in a total amount of from 0.1 to 30 wt %, relative to the total magnesia content.

7. The magnesia cement of claim 5, wherein it comprises finely ground magnesia in a total amount of up to 97 wt %, relative to the total dry mass of the refractory cement.

8. The magnesia cement of claim 1, wherein it comprises the caustic magnesia component together with the carboxylic acid component in an amount of at least 3 wt % relative to the total dry mass of the refractory cement.

9. The magnesia cement of claim 1, wherein the caustic magnesia component consists of caustic magnesia obtained by calcination of magnesium compounds at a temperature below 1100° C., wherein said magnesium compounds are fine powders before calcination and have an average particle size of less than 45 μm and/or a BET specific surface area of greater than 0.4 $m^2/g$.

10. The magnesia cement of claim 1, wherein the slightly soluble carboxylic acids are selected from the group consisting of fumaric acid, adipic acid, benzoic acid, phtalic acid, phtalic anhydride, and sorbic acid, and wherein those acids that are solid at room temperature have an average particle size of less than 60 μm, typically of from 1 to 55 μm.

11. The magnesia cement of claim 5, wherein the magnesia hydration retarding agent is selected from the group consisting of monosaccharides, polysaccharides, sugar alcohols, mineral acids, and salts of mineral acids.

12. The magnesia cement of claim 5, wherein it comprises finely ground hard-burned, dead-burned, and/or fused magnesia, all of said finely ground magnesia having an average particle size of less than 60 μm.

13. The magnesia cement according to claim 1, wherein the cement is formed into a part of at least one of: monolithic linings, precast shapes, prefabricated elements, functional products, fireproof products, and insulating products.

14. A product selected from the group consisting of concretes, suspensions, self-flowing castables, thixotropic castables, slip casting, tape casting, coating compositions, shotcrete mixes, gunning mixes, ramming mixes, repairing mixes, injection mixes, mortars, and bonding or joining agents, comprising the magnesia cement of claim 1.

15. A refractory material containing a magnesia cement according to claim 1, wherein it further comprises one or more functional additives in a total amount of from 0.1 to 15 wt %, relative to the total dry mass of the refractory material, wherein the functional additive is selected from the group consisting of dispersing agents, wetting agents, fluxes, non-flux agents for a crackfree heat up, and agents for chemical, mechanical or electrical modification of the cement.

16. The refractory material of claim 15, wherein the dispersing agents are selected from the group consisting of polyelectrolytes, polycarboxylates, and superplasticizers, the wetting agents are selected from the group consisting of soaps and ether derivatives, the fluxes are selected from the group consisting of eutectic mixtures promoting sintering, the non-flux agents for a crack-free heat up are selected from the group consisting of organic fibers and metallic fibers, wherein the fibers are capable of melting and/or decomposing and/or reacting below 100° C., and wherein the additive for chemical, mechanical or electrical modification of the cement is selected from the group consisting of metal powders, metal fibers, semiconductors, magnetic materials, and organic fiber materials.

17. The refractory material according to claim 15 comprising at least 1 wt. % of the magnesia cement, and additionally at least one of the following components:
 0.1 to 99 wt % of a raw material selected from the group consisting of a refractory, a ceramic, and a construction raw material, wherein said raw material has an average grain size of from 60 μm to 50 mm;
 0.1 to 99 wt % of a refractory, ceramic and/or construction raw material, wherein said raw material has an average grain size of from 0.1 to 60 μm.

18. The refractory material of claim 15, wherein the refractory and/or ceramic raw material comprises at least one of the following components:
 one or more metal oxides selected from the group consisting of alkaline and earth alkaline metal oxides;
 one or more metal oxides selected from the group consisting of $Cr_2O_3$, chrome ore, $Al_2O_3$, spinels, $SiO_2$, silicates, $TiO_2$, $ZrO_2$, oxides of rare earth metals, and oxides of iron group metals;
 one or more non-oxide refractory and/or ceramic materials selected from the group consisting of carbon, graphite, nitrides, and carbides; and
 wherein the construction raw material is selected from the group consisting of construction concretes, timber materials, and wood materials.

19. The refractory material comprising the magnesia cement according to claim 15, wherein the refractory material is formed into a part of at least one of: monolithic linings, precast shapes, prefabricated elements, functional products, fireproof products, and insulating products.

20. At least one product selected from the group consisting of concretes, suspensions, self-flowing or thixotropic castables, slip casting, tape casting, coating compositions, shotcrete mixes, gunning mixes, ramming mixes, repairing mixes, injection mixes, mortars, and bonding or joining agents, comprising the magnesia cement of claim 15.

* * * * *